Figure 1:
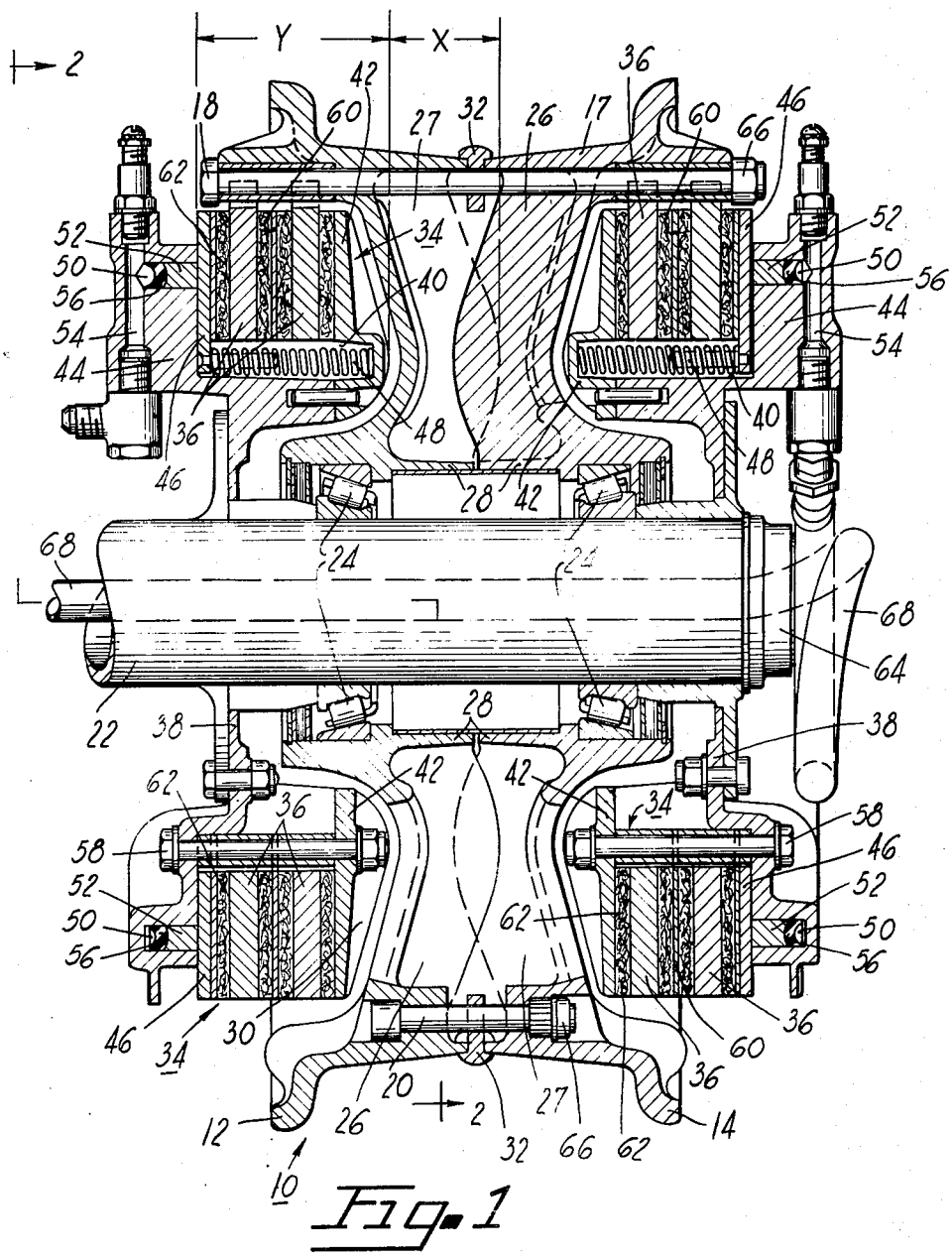

Aug. 11, 1953

I. F. CHAPIN 2,648,571

AIRPLANE WHEEL

Filed July 26, 1949

2 Sheets-Sheet 1

INVENTOR.
IRVING F. CHAPIN
BY
DA Gust
ATTORNEY

Aug. 11, 1953     I. F. CHAPIN     2,648,571
AIRPLANE WHEEL
Filed July 26, 1949     2 Sheets—Sheet 2
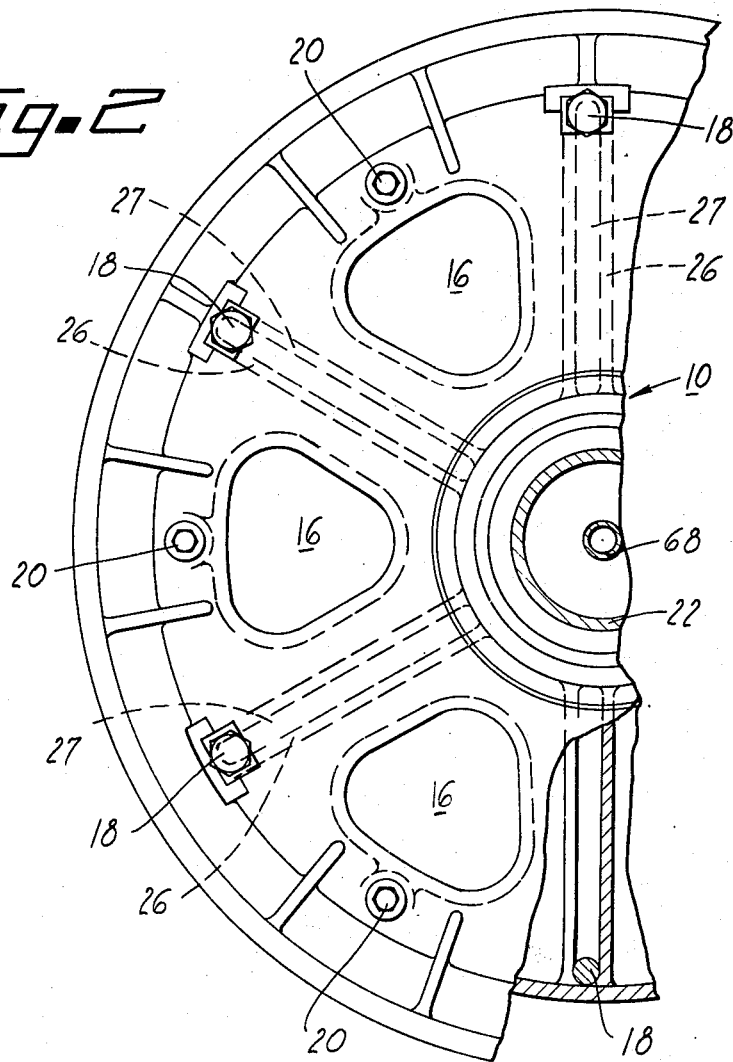
INVENTOR.
IRVING F. CHAPIN
BY
ATTORNEY Patented Aug. 11, 1953

2,648,571

UNITED STATES PATENT OFFICE 2,648,571

AIRPLANE WHEEL

Irving F. Chapin, South Bend, Ind., assignor to Bendix Aviation Corporation, South Bend, Ind., a corporation of Delaware Application July 26, 1949, Serial No. 106,941

7 Claims. (Cl. 301—64)

The present invention relates to improvements in an airplane wheel and brake, and more particularly to a wheel structure and to a wheel structure adapted to be fitted with a brake.

An object of the present invention is to provide a combination wheel and brake of relatively thin design capable of supporting a greater load than a conventional wheel and brake combination of the same thickness, or, stated in another way, a combination wheel and brake of thinner design, for a given load weight, than a conventional wheel and brake combination.

Another object of the present invention is to provide a wheel structure composed of two allochiral wheel sections which have interleaving ribs when assembled. This interleaving feature facilitates the use of strengthening ribs for each wheel section of sufficient cross-sectional area to support a given load.

In conventional split wheel designs, the strengthening ribs of the wheel sections are juxtaposed, thereby limiting the distance each rib can extend toward the axial center of the wheel to the axial center itself. Any increase in the axial dimension of the rib would necessarily be toward the outside of the wheel, thereby making the width of the wheel a direct function of the load to be supported. Applicant conceived the idea of rotating one of the wheel sections to a position where the ribs of this section would lie intermediate the ribs of the other wheel section, thereby permitting an increase in the axial dimension of each rib without increasing the overall width of the wheel. It is well known to those skilled in the aircraft art that a narrower wheel will present less drag to a plane in flight. Obviously, then, any innovation in wheels which will conduce to less drag and yet support the same load weight is of vital importance to the art.

Other objects and objects ancillary thereto will become apparent as the description proceeds.

In the drawings:

Figure 1 is a fragmental side elevation of an embodiment of the present invention with the brake removed showing the interleaving arrangement of the strengthening ribs; and Figure 2 is an axial section of Figure 1 taken substantially on section line 2—2 illustrating the relative overlapping of the strengthening ribs and the brake cavities.

Referring more particularly to the drawings, a wheel 10 is composed of two allochiral wheel sections 12 and 14 each being provided with a plurality of ventilating and weight reducing openings 16 and half tire rim sections 17. These wheel sections 12 and 14 are secured together by means of the relatively long circumferentially spaced bolts 18 and the shorter circumferentially spaced bolts 20, and are journaled on nonrotatable axle 22 by means of the axially spaced antifriction bearings 24. Radial strengthening ribs 26 of the wheel section 12 and ribs 27 of wheel section 14 connect the respective tire rim sections 17 to the respective wheel section hubs 28, and, as viewed more clearly in Figure 1, these ribs 26 and 27 are angularly spaced with respect to each other and slightly offset from the true radius of the wheel, the ribs of one wheel section lying between the ribs of the other wheel section. Each rib in either its slightly offset position or disposed radially of the wheel is described in the claims as being substantially radial of the wheel. As a practical matter, the ribs may be exactly radially disposed or offset as illustrated.

Each wheel section is formed with an outwardly facing brake cavity generally indicated by reference numeral 30, the depth of which is determined by the curvature of the respective ribs 26 and 27. Obviously, then, by correlating the axial dimension X (Figure 1) of the ribs 26 and 27 with the depth dimension Y of the brake cavities 30, a narrower wheel and brake combination for a given supported load is possible. Also, if a stronger wheel is desired, the axial dimension of the ribs 26 and 27 may be increased up to a certain point without interfering with any other part of the combination.

In the preferred embodiment of the present invention, an annular rim locating member 32 is used to locate and retain the inner tire rim edges in juxtaposition.

Positioned in each cavity 30 are disc brake assemblies 34 substantially identical in construction. A description of one will therefore suffice for the other.

The axially spaced rotor brake members 36 are of conventional design and are rotatable with the wheel and axially movable on the long bolts 18. The nonrotatable disc-shaped stator member 38 is shown splined to axle 22 and is provided with a radially outwardly opening annular channel generally indicated by reference numeral 40 which straddles rotor brake members 36. Channel 40 is composed of an annular brake reaction or backing member 42 and a pressure head or hydraulic actuator support member 44. An axially movable annular pressure plate 46 is yieldably urged into engagement with the inner face of support member 44 by brake return springs 48.

An annular piston chamber 50 is formed on the inner side of support member 44 to reciprocably receive an annular piston 52 operable under pressure fluid conducted through passage 54. A fluid sealing ring 56 may be used on the head of piston 52 to prevent the escape of fluid from chamber 50.

A plurality of stator bolts 58 penetrate the base of channel 40 at circumferentially spaced points and serve as anchors or keys for holding pressure plate 46 and stator brake members 60 against rotational movement but permitting axial movement thereof. By creating pressure on pressure plate 46 in a direction to tend to decrease the axial dimension of annular channel 40, the rotor and stator brake members, 36 and 60 will be frictionally engaged to produce braking torque. This pressure is created by piston 52 under the influence of pressure fluid admitted to passage 54.

As will obviously occur to any person skilled in the art, other types of brake assemblies may be positioned in brake cavities 30, for example, the inner surfaces of the outer peripheral margins of rims 17 could be used as cylindrical brake drums to be frictionally engaged by radially movable part cylindrical brake shoes. Broad novelty in the present invention resides in the relatively thin wheel and brake combination, and in the relatively thin wheel made possible by the interleaved ribs.

Suitable friction linings 62 may be secured to the stator and rotor brake members, the backing member 42, and pressure plate 46, as shown.

The wheel of the present invention, being constructed of separate sections, facilitates removal of the tire and disassembly of the wheel itself. For example, to remove the tire to disassemble the wheel, hub nut 64 and nuts 66 on bolts 18 and 20 are removed, fluid conduit 68 is disconnected, and wheel section 14 is pulled off axle 22. Easy access may thereby be gained to practically every part of the brake and wheel combination for inspection and repair purposes. The tire obviously slides off the split rim sections 17.

In order to effect a brake operation, with the wheel rotating and the brake in released position, fluid under pressure is introduced into conduit 68, passage 54, and chamber 50 to force piston 52 outwardly. Piston 52 bears against pressure plate 46 to cause frictional engagement of the rotor and stator brake members 36 and 60, respectively, against the pressure of springs 48. The rotational movement of wheel 10 is thereby retarded or completely stopped, as desired. Upon release of the brakes, the pressure in conduit 68 is reduced to permit the return of pressure plate 46 under the influence of springs 48, thereby permitting the rotor and stator brake members to withdraw from frictional engagement.

Although only one embodiment of the invention has been illustrated and described, various changes in the form and relative arrangements of the parts may be made to suit requirements.

I claim:

1. A wheel having a pair of outwardly facing brake cavities disposed radially inwardly from its outer edge comprising a pair of allochiral wheel sections, each of said sections having an antifriction bearing for supporting it on an axle and a half tire rim on its outer periphery which is provided with an inner edge, a plurality of circumferentially spaced substantially radial strengthening ribs of substantially rectangular cross-section for each wheel section, the wide dimension of each of said ribs lying in a plane parallel to the axis of said wheel, said ribs being curved around the aforementioned brake cavities, said wheel sections being secured together in such relation that the ribs of one section will lie between the ribs of the other section, an annular rim locating member receiving the inner edges of said rims, and a plurality of wheel section fastening members penetrating said rim locating member and the outer periphery of said wheel at circumferentially spaced points.

2. A wheel having a pair of outwardly facing brake cavities disposed radially inwardly from its outer edge comprising a pair of wheel sections, a plurality of separate circumferentially spaced radial strengthening ribs of substantially rectangular cross-section for each wheel section, each wheel section being perforate between each of said ribs, the wide dimension of each of said ribs lying in a plane including the axis of said wheel, said ribs being curved around the aforementioned brake cavities, said wheel sections being secured together in such relation that the ribs of one section will lie between the ribs of the other section, and a plurality of wheel section fastening members penetrating the outer periphery of said wheel at circumferentially spaced points.

3. A wheel having an outwardly facing brake cavity radially inwardly from its outer edge comprising a pair of wheel sections, each of said sections having an antifriction bearing for supporting it on an axle and a rim portion on its outer periphery which is provided with an inner edge, a plurality of circumferentially spaced substantially radial strengthening ribs of substantially rectangular cross-section for each wheel section, the wide dimension of each of said ribs lying in a plane parallel to the axis of said wheel, the ribs of the section having the brake cavity being curved around the aforementioned brake cavity, said wheel sections being secured together in such relation that the ribs of one section will lie between the ribs of the other section, an annular rim locating member receiving the inner edges of said rims, and a plurality of wheel section fastening members penetrating said rim locating member and the outer periphery of said wheel at circumferentially spaced points.

4. A wheel having a pair of outwardly facing brake cavities disposed radially inwardly from its outer edge comprising a pair of wheel sections, each of said sections having a half-tire rim on its outer periphery, which is provided with an inner edge, a plurality of circumferentially spaced substantially radial strengthening ribs of substantially rectanglular cross-section for each wheel section, the wide dimension of each of said ribs lying in a plane parallel to the axis of said wheel, said ribs being curved around the aforementioned brake cavities, said wheel sections being secured together in such relation that the ribs of one section will lie between the ribs of the other section, an annular rim locating member receiving the inner edges of said rims, and a plurality of wheel section fastening members penetrating said rim locating member and the outer periphery of said wheel at circumferentially spaced points.

5. A wheel having an outwardly facing brake cavity disposed radially inwardly from its outer edge comprising a pair of wheel sections, each of said sections having a half-tire rim on its outer periphery which is provided with an inner edge, a plurality of circumferentially spaced substantially radial strengthening ribs of substantially rectangular cross-section for each wheel section, the ribs of the section having the brake cavity being curved around the aforementioned brake cavity, said wheel sections being secured together in such relation that the ribs of one section will lie between the ribs of the other section, an annular rim locating member receiving the inner edges of said rims, and a plurality of wheel section fastening members penetrating said rim locating member and the outer periphery of said wheel at circumferentially spaced points.

6. A wheel having a pair of outwardly facing brake cavities disposed radially inwardly from its outer edge comprising a pair of wheel sections, each section having a rim portion on its periphery which is provided with an inner edge, a plurality of circumferentially spaced substantially radial strengthening ribs of substantially rectangular cross-section for each wheel section, the wide dimension of each of said ribs extending axially of said wheel, said ribs being curved around the aforementioned brake cavities, said wheel sections being secured together in such relation that the ribs of one section will lie between the ribs of the other section, an annular rim locating member receiving the inner edges of said rims, and a plurality of wheel section fastening members penetrating said rim locating member and the outer periphery of said wheel at circumferentially spaced points.

7. A wheel comprising a pair of wheel sections, each section carrying a portion of a full-tire rim, each rim portion being provided with an inner edge, a plurality of circumferentially spaced substantially radial strengthening ribs for each wheel section, said ribs having elongated cross-sectional shapes, the elongated dimensions of said ribs extending axially of said wheel, said wheel sections being secured together in such relation that the ribs of one section will lie between the ribs of the other section, an annular rim locating member receiving the inner edges of said rim portions, and a plurality of wheel section fastening member penetrating said rim locating member and the outer periphery of said wheel at circumferentially spaced points.

IRVING F. CHAPIN.

References Cited in the file of this patent

UNITED STATES PATENTS

| Number | Name | Date |
| --- | --- | --- |
| 931,403 | Fleming | Aug. 17, 1909 |
| 1,269,172 | Forsyth | June 11, 1918 |
| 1,420,432 | Lachman | June 20, 1922 |
| 1,422,167 | Barry | July 11, 1922 |
| 1,492,416 | Beeman | Apr. 29, 1922 |
| 2,313,223 | Frank | Mar. 9, 1943 |
| 2,381,166 | Hollerith | Aug. 7, 1945 |
| 2,410,470 | Wallace | Nov. 5, 1946 |
| 2,417,854 | Barish | Mar. 25, 1947 |
| 2,427,378 | Ash | Sept. 16, 1947 |
| 2,423,011 | DuBois | June 24, 1947 |
| 2,435,465 | Brown | Feb. 3, 1948 |

FOREIGN PATENTS

| Number | Country | Date |
| --- | --- | --- |
| 630,560 | Germany | May 1936 |